(12) United States Patent
Terada

(10) Patent No.: US 9,751,280 B2
(45) Date of Patent: Sep. 5, 2017

(54) RUGGED ELASTIC NONWOVEN FABRIC AND METHOD FOR MANUFACTURING THE SAME

(75) Inventor: Hirokazu Terada, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 42 days.

(21) Appl. No.: 13/456,209

(22) Filed: Apr. 25, 2012

(65) Prior Publication Data
US 2012/0276347 A1    Nov. 1, 2012

(30) Foreign Application Priority Data
Apr. 28, 2011   (JP) ................. 2011-101805

(51) Int. Cl.
*B32B 5/26*    (2006.01)
*D04H 1/54*    (2012.01)
(Continued)

(52) U.S. Cl.
CPC .............. *B32B 5/26* (2013.01); *D04H 1/4374* (2013.01); *D04H 1/50* (2013.01); *D04H 1/54* (2013.01);
(Continued)

(58) Field of Classification Search
CPC .. B32B 5/26; B32B 7/04; B32B 38/00; D04H 1/54; D04H 1/559; D04H 13/00; D04H 1/50; D04H 1/541; D04H 1/4374
(Continued)

(56) References Cited

U.S. PATENT DOCUMENTS 5,108,820 A  *  4/1992  Kaneko .................... D01F 8/06
                                                             428/198
5,491,016 A     2/1996  Kaiser et al.
(Continued)

FOREIGN PATENT DOCUMENTS

EP       1283028       2/2003
EP       1323400       7/2003
(Continued)

OTHER PUBLICATIONS

English translation for JP 2007-084958.*
(Continued)

*Primary Examiner* — Peter Y Choi
(74) *Attorney, Agent, or Firm* — Jiang Chyun Intellectual Property Office

(57) ABSTRACT

To provide a rugged elastic nonwoven fabric, in which a first fibrous layer containing heat-shrinkable fibers (1A) being latent crimp conjugate fibers, and a second fibrous layer containing heat-fusible heat-shrinkable fibers (2A) or non-heat-shrinkable fibers (2B) both having smaller shrinkage as compared with the fibers (1A) are laminated, and both of the fibrous layers are partially bonded and united with a number of bonded parts arranged at intervals, wherein a maximum shrinkage development temperature of the first fibrous layer is 135° C. or higher, a melting or softening point of a heat-fusible component of the fibers (2A) or (2B) is 70° C. or higher to 130° C. or lower, the second fibrous layer between the bonded parts is projected in a convex by shrinking of the first fibrous layer, and fibers constituting the first fibrous layer are not bonded with each other.

5 Claims, 1 Drawing Sheet

(51) Int. Cl.
*D04H 1/559* (2012.01)
*D04H 1/4374* (2012.01)
*D04H 1/50* (2012.01)
*D04H 1/541* (2012.01)
*D04H 13/00* (2006.01)

(52) U.S. Cl.
CPC ............. *D04H 1/541* (2013.01); *D04H 1/559* (2013.01); *D04H 13/00* (2013.01); *Y10T 428/2481* (2015.01)

(58) Field of Classification Search
USPC ................................................. 442/364, 381
See application file for complete search history.

(56) References Cited

U.S. PATENT DOCUMENTS

2002/0058128 A1\* 5/2002 Toyoshima et al. .......... 428/182
2003/0162460 A1\* 8/2003 Saka et al. .................... 442/394

FOREIGN PATENT DOCUMENTS

| | | |
|---|---|---|
| EP | 1340848 | 9/2003 |
| EP | 1754816 | 2/2007 |
| EP | 2384881 | 11/2011 |
| JP | 10-114004 | 5/1998 |
| JP | 2006-045724 | 2/2006 |
| JP | 2007084958 A \* | 4/2007 |
| JP | 2009-256856 | 11/2009 |

OTHER PUBLICATIONS

"Search Report of European Counterpart Application" issued on Jun. 21, 2012, p. 1-p. 7.
"Office Action of European Counterpart Application," issued on Oct. 28, 2014, p. 1-p. 5.
"1st Office Action of China Counterpart Application", issued on Sep. 28, 2014, p. 1-p. 15, with English translation thereof.
"2nd Office Action of China Counterpart Application", issued on Aug. 12, 2015, p. 1-p. 12, with English translation thereof.

\* cited by examiner

RUGGED ELASTIC NONWOVEN FABRIC AND METHOD FOR MANUFACTURING THE SAME

CROSS-REFERENCE TO RELATED APPLICATIONS

This application claims the priority benefit of Japan application serial no. 2011-101805, filed on Apr. 28, 2011. The entirety of the above-mentioned patent application is hereby incorporated by reference herein and made a part of this specification.

TECHNICAL FIELD

The present invention relates to a rugged nonwoven fabric having an excellent elasticity and a method for manufacturing the same.

BACKGROUND ART

As a technique for obtaining a nonwoven fabric having elasticity, fibers produced from an elastomer resin according to a meltblown method are piled on a conveyer, and then bonding between the fibers is caused with heat rolls, and the thus obtained sheet is known (see patent document 1).

Then, the technique includes a method for processing latent crimp fibers into a web according to a carding method, allowing entanglement by means of a water jet, and then allowing development of crimps by performing heat treatment (shrinking treatment), and thus structurally giving elasticity (see patent document 2).

As one of other methods, partial thermocompression bonding is performed in a thickness direction of a laminate between a first layer and a second layer using the first layer containing heat-shrinkable fibers having a maximum heat-shrinking development temperature of 130° C. or lower and a lower melting point as compared with non-heat-shrinkable fibers in the second layer, and the second layer comprising the non-heat-shrinkable fibers, and then shrinking treatment is allowed, and thus a three-dimensional sheet is obtained (see patent document 3). In the three-dimensional sheet disclosed in patent document 3, an elastomeric behavior is shown with elasticity of the nonwoven fabric by development of crimps (three-dimensional conformational shape) of the heat-shrinkable fibers of the first layer.

PRIOR-ART DOCUMENTS

Patent Documents

Patent Document 1: JP-A-2009-256856 (the term "JP-A" as used herein means an "unexamined published Japanese patent application")
Patent Document 2: JP-A-10-114004
Patent Document 3: JP-A-2006-45724

SUMMARY OF INVENTION

Problems that the Invention is to Solve

However, a sheet disclosed in patent document 1 has a very low bulkiness, and therefore has a low gas permeability and a damaged feeling. Moreover, the sheet has a problem of a poor surface smoothness due to friction specific to an elastomer resin. Moreover, a nonwoven fabric obtained by a method disclosed in patent document 2 has a problem of a low nonwoven fabric strength due to structure united by entanglement.

Furthermore, a three-dimensional sheet disclosed in patent document 3 has a problem of insufficient development of elasticity because bonding between fibers is caused with each other by thermal melting of the fibers in the first layer together with heat shrinking in a heat-shrinking treatment process, and therefore elasticity is adversely affected.

Accordingly, a subject of the invention is to provide a nonwoven fabric having a high elasticity and a high nonwoven fabric strength, and simultaneously having an excellent feeling.

Means for Solving the Problems

The inventor of the invention has diligently continued to conduct research for solving the problem, as a result, has found that a nonwoven fabric has a high elasticity and a high nonwoven fabric strength, and simultaneously has an excellent feeling, when the nonwoven fabric is applied in which a first fibrous layer and a second fibrous layer are laminated using the first fibrous layer containing heat-shrinkable fibers (1A) and having a maximum shrinkage development temperature of 135° C. or higher and the second fibrous layer containing heat-fusible heat-shrinkable fibers (2A) or heat-fusible non-heat-shrinkable fibers (2B) both having a smaller shrinkage as compared with the heat-shrinkable fibers (1A), and a melting point or a softening point of a heat-fusible component of the heat-shrinkable fibers (2A) or the non-heat-shrinkable fibers (2B) being in the range of 70° C. or higher to 130° C. or lower, and then both of the fibrous layers are partially bonded and united with a large number of bonded parts arranged at intervals, the second fibrous layer between the bonded parts is projected in a convex by shrinking of the first fibrous layer, and fibers constituting the first fibrous layer are not bonded with each other, and thus has completed the invention based on the knowledge.

The invention concerns a nonwoven fabric in which a specific first fibrous layer and a specific second fibrous layer are laminated, and both of the specific fibrous layers are partially bonded and united with a large number of bonded parts arranged at intervals, wherein a maximum shrinkage development temperature of the specific first fibrous layer is 135° C. or higher, and a melting point or a softening point of a heat-fusible component of specific fibers (2A) or (2B) in the specific second fibrous layer is in the range of 70° C. or higher to 130° C. or lower, the specific second fibrous layer between the bonded parts is projected in a convex by shrinking of the specific first fibrous layer, and fibers constituting the specific first fibrous layer are not bonded with each other.

The invention also concerns a method for manufacturing a nonwoven fabric, comprising specific three steps:
step (1) for laminating a specific second fibrous layer onto at least one side of a specific first fibrous layer;
step (2) for performing bonding processing of both of the specific fibrous layers laminated in the step (1) and uniting both of the specific fibrous layers in a thickness direction with a large number of bonded parts arranged at intervals; and
step (3) for performing shrinking processing of both of the specific fibrous layers united in step (2) to shrink specific fibers (1A) contained in the specific first fibrous layer.

More specifically, essential points of the invention reside in the following <1> to <7>.

<1> A nonwoven fabric in which a first fibrous layer and a second fibrous layer are laminated using the first fibrous layer containing heat-shrinkable fibers (1A) being latent crimp conjugate fibers and the second fibrous layer containing heat-fusible heat-shrinkable fibers (2A) or heat-fusible non-heat-shrinkable fibers (2B) both having a smaller shrinkage as compared with the heat-shrinkable fibers (1A), and both of the fibrous layers are partially bonded and united with a large number of bonded parts arranged at intervals, wherein a maximum shrinkage development temperature of the first fibrous layer is 135° C. or higher, and a melting point or a softening point of a heat-fusible component of the heat-shrinkable fibers (2A) or the non-heat-shrinkable fibers (2B) is in the range of 70° C. or higher to 130° C. or lower, the second fibrous layer between the bonded parts is projected in a convex by shrinking of the first fibrous layer, and fibers constituting the first fibrous layer are not bonded with each other.

<2> The nonwoven fabric according to <1>, wherein the heat-shrinkable fibers (2A) are latent crimp conjugate fibers.

<3> The nonwoven fabric according to <1> or <2>, wherein the melting point or the softening point of the heat-shrinkable fibers (2A) or the non-heat-shrinkable fibers (2B) is lower than a melting point of the heat-shrinkable fibers (1A).

<4> The nonwoven fabric according to any one of <1> to <3>, wherein the bonded parts are formed by heat-press bonding.

<5> A method for manufacturing a nonwoven fabric, comprising the following steps (1) to (3):

the step (1) for laminating a second fibrous layer containing heat-fusible heat-shrinkable fibers (2A) or heat-fusible non-heat-shrinkable fibers (2B) both having a smaller shrinkage as compared with the heat-shrinkable fibers (1A) onto at least one side of a first fibrous layer containing heat-shrinkable fibers (1A);

the step (2) for performing bonding processing of both of the fibrous layers laminated in the step (1) and uniting both of the fibrous layers in a thickness direction with a large number of bonded parts arranged at intervals; and the step (3) for performing shrinking processing of both of the fibrous layers united in the step (2) to shrink the heat-shrinkable fibers (1A) contained in the first fibrous layer.

<6> The method for manufacturing the nonwoven fabric according to <5>, wherein a laminate is subjected to bonding processing by heat-press bonding in the step (2).

<7> The method for manufacturing the nonwoven fabric according to <5> or <6>, wherein bonding processing in the step (2) and shrinking processing in the step (3) are performed at a temperature equal to or lower than a melting point of the heat-shrinkable fibers (1A) contained in the first fibrous layer.

Advantageous Effects of the Invention

In a nonwoven fabric of the invention, a maximum shrinkage development temperature of a first fibrous layer is approximately 135° C. or higher, and simultaneously a melting point or a softening point of a heat-fusible component of heat-shrinkable fibers (2A) or non-heat-shrinkable fibers (2B) to be used for a second fibrous layer is in the range of 70° C. or higher to 130° C. or lower, and thus both of the fibrous layers are allowed to be partially bonded in a temperature range where the first fibrous layer does not shrink (shrinkage of the first fibrous layer is preferably 50% or less).

Therefore, fibers constituting the first fibrous layer are neither thermally melted nor bonded with each other by heating in a step for partially bonding both of the fibrous layers and a step for shrinking the first fibrous layer. Furthermore, shrinking of the first fibrous layer can be prevented upon partially bonding both of the fibrous layers. Thus, the nonwoven fabric of the invention is allowed to keep an excellent elasticity, and simultaneously obtain a uniform texture and generation of sufficient convex projections.

In the nonwoven fabric of the invention, the fibers constituting the first fibrous layer are not involved in bonding by themselves, and the fibers per se do not contribute to uniting through lamination. The heat-shrinkable fibers (2A) or the non-heat-shrinkable fibers (2B) constitute bonded parts by heat fusion of the heat-fusible component, and thus contribute to uniting through lamination. Thus, particularly when the heat-shrinkable fibers (2A) or the non-heat-shrinkable fibers (2B) are constituted of an elastomer (in the case of fibers constituted of a single component, the elastomer being the single component serves as the heat-fusible component, and in the case of conjugate fibers, the elastomer being a low-melting point component is involved in thermal bonding as the heat-fusible component), particularly excellent advantageous effects are obtained. More specifically, the bonded parts per se also come to have elasticity, as a result, the elasticity and feeling of the nonwoven fabric become more excellent owing to mitigation of an adverse effect on an elastic performance as caused by fixing between the fibers in the bonded parts.

Moreover, thermal bonding between the fibers of the first fibrous layer is not caused with each other, and thus due to a movement of development of crimps of latent crimp fibers within the first fibrous layer in a shrinking step, an arrangement is changed such that a part of fibers having a free movement and constituting the first fibrous layer is directed toward an inside of the convex projections in a boundary surface with the second fibrous layer for forming the convex projections, and thus the part tends to act for pushing the fibers of the second fibrous layer into an upper side of the convex projections. As a result, the fibers can highly fill the inside the convex projections, and simultaneously an effect of improving resistance to deformation of a shape under stress in the convex projections is expected.

MODES FOR CARRYING OUT THE INVENTION

A nonwoven fabric of the invention includes a rugged elastic nonwoven fabric in which a first fibrous layer and a second fibrous layer both comprising fibers having a different elasticity are partially bonded and thus united, and the second fibrous layer is projected in a convex by performing shrinking treatment.

More specifically, the nonwoven fabric of the invention includes a nonwoven fabric in which a first fibrous layer and a second fibrous layer are laminated using the first fibrous layer containing heat-shrinkable fibers (1A) and the second fibrous layer containing heat-fusible heat-shrinkable fibers (2A) or heat-fusible non-heat-shrinkable fibers (2B) both having a smaller shrinkage as compared with the heat-shrinkable fibers (1A), and both of the fibrous layers are partially bonded and united with a large number of bonded parts arranged at intervals. In the invention, a term "heat-fusible" includes bonding by thermal melting, and also bonding by thermal softening.

The nonwoven fabric of the invention is characterized in that a maximum shrinkage development temperature of the first fibrous layer is approximately 135° C. or higher, a melting point or a softening point of a heat-fusible component of the heat-shrinkable fibers (2A) or the non-heat-shrinkable fibers (2B) is in the range of approximately 70° C. or higher to approximately 130° C. or lower, the second fibrous layer between the bonded parts is projected in the convex by shrinking of the first fibrous layer, and fibers constituting the first fibrous layer are not bonded with each other.

Figure 1:
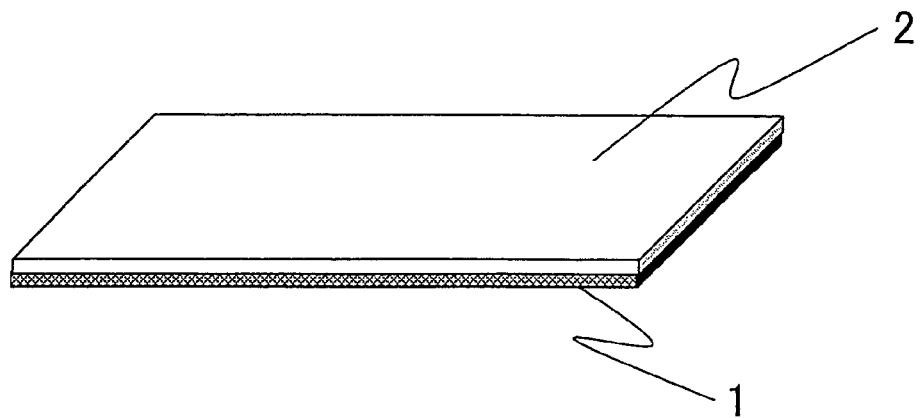
FIG. 1 is a schematic plan view of a laminate between a first fibrous layer and a second fibrous layer before shrinking treatment.
Figure 2:
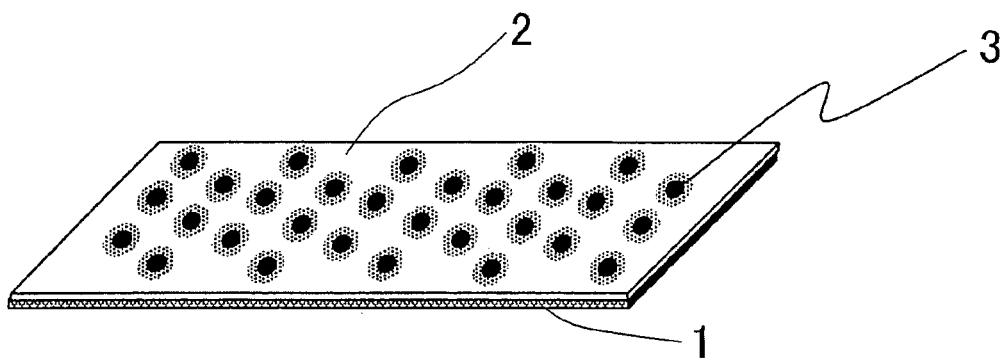
FIG. 2 is a schematic plan view showing one embodiment of a nonwoven fabric of the invention.
Figure 3:
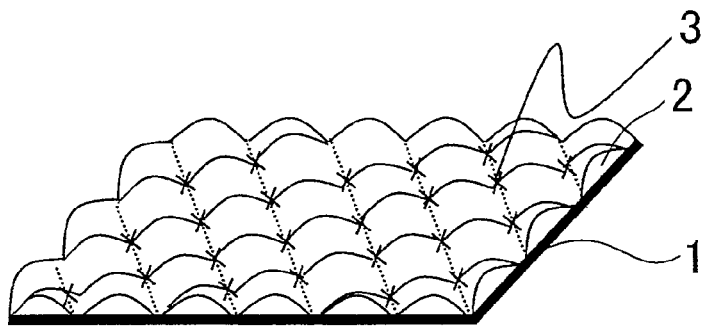
FIG. 3 is a perspective view showing one embodiment of a nonwoven fabric of the invention.

The nonwoven fabric of the invention will be explained with referring to a drawing. FIG. 1 is a schematic plan view of a laminate between a first fibrous layer and a second fibrous layer before shrinking treatment. FIG. 2 is a schematic plan view showing one embodiment of a nonwoven fabric of the invention. FIG. 3 is a perspective view showing one embodiment of a nonwoven fabric of the invention. In FIG. 2 and FIG. 3, a reference numeral 3 is one of the bonded parts.

The first fibrous layer and the second fibrous layer are partially bonded and united in a thickness direction with a large number of bonded parts arranged at intervals. In the invention, "bonded parts" means a region in which the fibers constituting the first fibrous layer and fibers constituting the second fibrous layer are bonded in cross points, contact parts and so forth of the fibers with each other in a boundary surface between the first fibrous layer and the second fibrous layer.

When seen from a high angle, the bonded parts between the first fibrous layer and the second fibrous layer as formed in the nonwoven fabric of the invention are regularly distributed and have a predetermined pattern in many cases. An arrangement of the bonded parts is not particularly limited, including a parallel arrangement or a staggered arrangement, but is preferably the staggered arrangement in view of nonwoven fabric tenacity.

A total area ratio of the bonded parts (embossed points in the case of embossing) between the first fibrous layer and the second fibrous layer in the nonwoven fabric of the invention is preferably in the range of approximately 2% to approximately 20%, further preferably, in the range of approximately 3% to approximately 15%, still further preferably, in the range of approximately 4% to approximately 10%.

The total area ratio of the bonded parts is allowed to be approximately 2% or more, and thus nonwoven fabric strength obtained is improved. Moreover, the total area ratio of the bonded parts is allowed to be approximately 20% or less, and thus the bonded parts do not adversely affect generation of shrinking, and elasticity is improved.

An area of one of the bonded parts is preferably in the range of approximately 0.5 to approximately 20 mm$^2$ in view of the nonwoven fabric strength. In particular, a distance between the bonded parts is preferably in the range of approximately 2 to approximately 20 millimeters, further preferably, in the range of approximately 4 to approximately 10 millimeters in view of elasticity.

A shape of the bonded parts is not particularly limited, but includes a round shape, an ellipse or a diamond shape. The shape is preferably round in view of uniformly shrinking the first fibrous layer in an MD direction and a CD direction, and difficulty in generating anisotropy by shrinking thereof.

An expression "fibers constituting the first fibrous layer are not bonded with each other" means a state where the fibers constituting the first fibrous layer are not bonded with each other by thermal melting. The state where the fibers constituting the first fibrous layer are not bonded with each other can be confirmed by observation by means of a microscope (digital microscope, VHX-900 made by Keyence Corporation, for example). The fibers constituting the first fibrous layer are not bonded with each other, and thus the nonwoven fabric of the invention shows an excellent elasticity.

An expression "projected in the convex" means formation of projections having a convex shape by projection of the second fibrous layer on a side of the second fibrous layer due to shrinking of the first fibrous layer in parts where the bonded parts are not formed.

First Fibrous Layer

The maximum shrinkage development temperature of the first fibrous layer is approximately 135° C. or higher, further preferably, approximately 140° C. or higher, still further preferably, approximately 145° C. or higher, and is preferably equal to or lower than a melting point of a high-melting point component of the heat-shrinkable fibers (1A) contained in the first fibrous layer.

In the invention, "maximum shrinkage development temperature" means a temperature causing the largest shrinkage within a range without exceeding the melting point of the high-melting point component of the heat-shrinkable fibers (1A) constituting the first fibrous layer. The maximum shrinkage development temperature is measured by a method as described later in Examples.

The maximum shrinkage development temperature of the first fibrous layer is allowed to be approximately 135° C. or higher, and thus the first fibrous layer and the second fibrous layer can be partially bonded in a temperature range where the first fibrous layer does not shrink or development of shrinking thereof is sufficiently small, and two-layer uniting of both of the fibrous layers is allowed without generating bonding of the fibers constituting the first fibrous layer with each other. According to the invention, the fibers constituting the first fibrous layer are selected on the basis of the maximum shrinkage development temperature, and thus a nonwoven fabric having an excellent elasticity can be obtained without the fibers constituting the first fibrous layer bonding with each other, even when both of the fibrous layers are subjected to bonding processing and heat-shrinking processing in an ordinarily set temperature range.

In addition, an expression "equal to or lower than the melting point of the high-melting point component of the heat-shrinkable fibers (1A)" means preferably approximately 250° C. or lower when the high-melting point component is polyester, and approximately 160° C. or lower when the high-melting point component is polypropylene fibers.

The first fibrous layer contains the heat-shrinkable fibers (1A). Content of the heat-shrinkable fibers (1A) in the first fibrous layer is preferably approximately 60% by mass or more, further preferably, approximately 80% by mass or more based on the mass of the first fibrous layer. The content of the heat-shrinkable fibers (1A) in the first fibrous layer is allowed to be in the range, and thus the first fibrous layer shows a high shrinkage and the nonwoven fabric obtained has a good elasticity.

Heat-Shrinkable Fibers (1A)

The heat-shrinkable fibers (1A) are latent crimp conjugate fibers. Herein, "latent crimp fibers" means fibers that cause shrinking by heat to develop crimps. The heat-shrinkable fibers (1A) preferably show a high shrinkage by development of crimps in a shrinking processing step, and do not cause bonding of the fibers with each other by heat fusion thereof.

The fibers showing a high shrinkage by development of crimps mean fibers showing a shrinkage of preferably approximately 40% or more, further preferably, approximately 50% or more, still further preferably, approximately 65% or more in the MD direction by development of crimps, when the fibers are processed into a web having a unit weight of 100 g/m$^2$ and the web is allowed to stand in an oven at 120° C. for 5 minutes. The shrinkage of the heat-shrinkable fibers (1A) is allowed to be approximately 40% or more, and thus a sufficient elasticity can be given to a nonwoven fabric finally obtained to sufficiently generate the convex projections.

Moreover, the shrinkage of the heat-shrinkable fibers (1A) is allowed to be approximately 40% or more, and thus the fibers are sufficiently entangled by development of crimps of the heat-shrinkable fibers (1A) in heat-shrinking processing. According to an effect of the entanglement, even when the heat-shrinkable fibers (1A) are short fibers, dropping of the heat-shrinkable fibers (1A) can be suppressed. Thus, uniting as the first fibrous layer can be maintained although bonding between the heat-shrinkable fibers (1A) constituting the first fibrous layer is not caused with each other.

The fibers that do not cause bonding of the fibers with each other by heat fusion mean fibers that are not bonded with each other in a temperature of bonding processing of both of the fibrous layers and a temperature of shrinking processing thereof.

Even if the heat-shrinkable fibers (1A) comprising the latent crimp conjugate fibers originally show a high shrinkage, when bonding of the fibers with each other is caused simultaneously with bonding processing or shrinking processing of both of the fibrous layers, the fibers are fixed by the bonding. Therefore, a movement of shrinking the fibers, namely, development of crimps is adversely affected, and a sufficient shrinking is not obtained, and thus a possible elastic width of the first fibrous layer becomes narrow. Moreover, fixing between the fibers is caused, and therefore a high stress is needed upon elongation.

As a result, a high elastic performance is not obtained and feeling of the nonwoven fabric decreases. Accordingly, a high elasticity can be given to the nonwoven fabric by using the fibers that do not cause bonding of the fibers with each other for the first fibrous layer.

A resin constituting the heat-shrinkable fibers (1A) comprises a combination of a low-melting point component and the high-melting point component. Specific examples of the resin used for the heat-shrinkable fibers (1A) include polyolefin, polyester and polyamide. In addition, in the case where "low-melting point component" is referred to in the invention, the case may include a component having only a softening point without showing a melting point.

Specific examples of the low-melting point component of the heat-shrinkable fibers (1A) include an ethylene-propylene binary copolymer, a propylene-butene-1 binary copolymer, an ethylene-propylene-butene-1 ternary copolymer, a propylene-hexene-1 binary copolymer and a propylene-octene-1 binary copolymer, and a resin comprising a mixture thereof.

In view of low-temperature heat-shrinking properties and cost, the low-melting point component of the heat-shrinkable fibers (1A) preferably includes an ethylene-propylene binary copolymer comprising an ethylene content in the range of approximately 4 to approximately 10% by mass and a propylene content in the range of approximately 90 to approximately 96% by mass, and an ethylene-propylene-butene-1 ternary copolymer comprising an ethylene content in the range of approximately 1 to approximately 7% by mass, a propylene content in the range of approximately 90 to approximately 98% by mass and a 1-butene content in the range of approximately 1 to approximately 5% by mass.

The melting point of the low-melting point component of the heat-shrinkable fibers (1A) is preferably in the range of approximately 128° C. to approximately 160° C., further preferably, in the range of approximately 130° C. to approximately 150° C. The melting point of the low-melting point component is allowed to be approximately 128° C. or higher, and thus melting of a resin in a low-melting point side is prevented in the temperature of shrinking processing, and a decrease in elastic performance by bonding can be suppressed.

In view of spinnability and processability, a melt mass flow rate of the low-melting point component is preferably in the range of approximately 0.1 to approximately 80 g/10 min., further preferably, in the range of approximately 3 to approximately 40 g/10 min. under conditions M (230° C., 2.16 kgf) according to JIS K7210.

Specific examples of the high-melting point component of the heat-shrinkable fibers (1A) include polypropylene and polyester. Polyester is used as the high-melting point component, and thus a difference in a melting point as compared with a melting point of the low-melting point component can be increased.

Specific examples of polypropylene include a polypropylene homopolymer and a copolymer of propylene with ethylene or any other olefin and a copolymer of propylene with any other component. Specific examples of polyester include polyethylene terephthalate, polybutyrene terephthalate and a copolymer thereof.

As the high-melting point component, a propylene homopolymer or a copolymer of propylene with a small amount of ethylene or α-olefin, ordinarily, with approximately 2% by mass or less thereof is preferred. Specific examples of such a crystalline polypropylene include a crystalline polypropylene obtained using a versatile Ziegler-Natta catalyst or a metallocene catalyst.

The melting point of the high-melting point component of the heat-shrinkable fibers (1A) is preferably in the range of approximately 150 to approximately 165° C., further preferably, in the range of approximately 155 to approximately 160° C. The melting point of the high-melting point component is allowed to be approximately 150° C. or higher, and thus a difference in a melting point as compared with a melting point of the low-melting point component can be increased, and a width of temperature of processing during shrinking processing can be increased.

In view of spinnability and processability, a melt mass flow rate of the high-melting point component of the heat-shrinkable fibers (1A) is preferably in the range of approximately 0.1 to approximately 80 g/10 min., further preferably, in the range of approximately 3 to approximately 40 g/10 min. under the conditions M (230° C., 2.16 kgf) according to JIS K7210.

A cross-sectional shape of the heat-shrinkable fibers (1A) is not particularly limited, but specific examples include a concentric sheath-core type, an eccentric sheath-core type and a parallel type. Among the types, the eccentric sheath-core type and the parallel type are preferred, and the parallel type is particularly preferred because high-latent crimp fibers can be obtained by using conjugate fibers having the parallel type in the cross-sectional shape.

A denier of the heat-shrinkable fibers (1A) is preferably in the range of approximately 1.0 dtex to approximately 20 dtex, further preferably, in the range of approximately 1.5 dtex to approximately 10 dtex, still further preferably, in the range of approximately 2.2 dtex to approximately 7.0 dtex.

The denier of the heat-shrinkable fibers (1A) is allowed to be approximately 1.0 dtex or more, and thus when the fibers are processed through a carding process, generation of nep or occurrence of disarray of texture is prevented, and further a decrease in processing speed can be suppressed, for example. Moreover, the denier is allowed to be approximately 20 dtex or less, and thus a decrease in development of crimps is prevented, and a shrinkage of approximately 40% or more can be easily obtained.

However, if a denier is within the range where shrinkage can be maintained, different heat-shrinkable fibers having a denier deviating from the range of the above denier may be mixed and used. Moreover, fibers other than the heat-shrinkable fibers (1A) may be mixed and used in the first fibrous layer within the range where advantageous effects of the invention are not adversely affected.

The heat-shrinkable fibers (1A) may be short fibers, or long fibers as obtained according to a spunbond method or a meltblown method. In the case of the short fibers, fiber length is not particularly limited, but is preferably in the range of approximately 20 to approximately 100 millimeters.

Second Fibrous Layer

The second fibrous layer includes the heat-fusible heat-shrinkable fibers (2A) (hereinafter, also simply referred to as heat-shrinkable fibers (2A)) or the heat-fusible non-heat-shrinkable fibers (2B) each having a smaller shrinkage as compared with the heat-shrinkable fibers (1A).

The second fibrous layer preferably includes the heat-shrinkable fibers (2A) or the non-heat-shrinkable fibers (2B) preferably in the range of approximately 60% by mass or more, and in view of nonwoven fabric tenacity, further preferably, in the range of approximately 70% by mass ore more based on the mass of the second fibrous layer, and is particularly preferably constituted of only the heat-shrinkable fibers (2A), the non-heat-shrinkable fibers (2B) or mixed fibers thereof.

The second fibrous layer includes the heat-shrinkable fibers (2A) or the non-heat-shrinkable fibers (2B) in the range of approximately 60% by mass or more based on the mass of the second fibrous layer, and thus a nonwoven fabric suitable for extensible properties and feeling are formed.

In view of the elasticity of the nonwoven fabric, the second fibrous layer preferably includes the heat-shrinkable fibers (2A) in the range of approximately 60% by mass or more, further preferably, in the range of approximately 70% by mass or more, still further preferably, in the range of approximately 80% by mass or more based on the mass of the second fibrous layer, and is particularly preferably constituted of only the heat-shrinkable fibers (2A).

Other fibers that may be included in the second fibrous layer are not particularly limited as long as advantageous effects of the invention are not adversely affected, but specific examples include rayon and cotton.

In the second fibrous layer between the bonded parts of the first fibrous layer and the second fibrous layer, the fibers constituting the second fibrous layer for forming the convex projections may be or may not be thermally bonded with each other in contact points therebetween, but thermal bonding with each other is preferred because the nonwoven fabric strength becomes higher.

Moreover, the fibers constituting the second fibrous layer for forming the convex projections are thermally bonded with each other in the contact points, and thus fiber fluffing in the convex projections can be improved. In particular, upon using the nonwoven fabric of the invention as a hook and loop fastener member by taking advantage of a rugged structure thereof, fiber fluffing from the convex projections caused by repeatedly using the member is suppressed to produce an effect of improving durability.

Heat-Shrinkable Fibers (2A) and Non-Heat-Shrinkable Fibers (2B)

The heat-shrinkable fibers (2A) have a smaller shrinkage as compared with the heat-shrinkable fibers (1A). An expression "smaller shrinkage as compared with the heat-shrinkable fibers (1A)" means that a difference in shrinkage between the heat-shrinkable fibers (1A) and heat-shrinkable fibers (2A) {shrinkage of heat-shrinkable fibers (1A)—shrinkage of heat-shrinkable fibers (2A)} is preferably approximately 10% or more, further preferably, approximately 30% or more in the above shrinkage. When the shrinkable fibers (2A) or the non-shrinkage fibers (2B) are processed into a web having a unit weight of 100 $g/m^2$, and the web is allowed to thermally stand in an oven at 120° C. for 5 minutes, shrinkage in the MD direction is preferably approximately 35% or less, further preferably, approximately 25% or less. The shrinkage is allowed to be approximately 35% or less, and thus a difference in shrinking of the second fibrous layer as compared with the first fibrous layer can be increased, and thus the convex projections are easily generated in a shrinking treatment step.

A resin constituting the heat-shrinkable fibers (2A) or the non-heat-shrinkable fibers (2B) contains a heat-fusible component involved in thermal bonding by melting of the component. The heat-shrinkable fibers (2A) or the non-heat-shrinkable fibers (2B) may be single component fibers consisting of the heat-fusible component, or may be conjugate fibers comprising a combination of the high-melting point component and the low-melting point component.

In the case of the conjugate fibers, the low-melting point component is involved in thermal bonding as the heat-fusible component. Specific examples of the resin used for the heat-shrinkable fibers (2A) or the non-heat-shrinkable fibers (2B) include polyolefin, polyester and polyamide. The non-heat-shrinkable fibers (2B) may be single component fibers comprising polyolefin, polyester and so forth as long as the non-heat-shrinkable fibers (2B) are heat-fusible.

Specific examples of the low-melting point component in the case where the heat-shrinkable fibers (2A) or the heat-fusible non-heat-shrinkable fibers (2B) are the conjugate fibers include LDPE, L-LDPE and a thermoplastic elastomer.

Specific examples of the thermoplastic elastomer include a hydrogenated styrene-based elastomer (SEBS) and a thermoplastic polyurethane (TPU). In view of compatibility, an olefin-based elastomer is preferably used.

Specific examples of the olefin-based elastomer include an ethylene-propylene rubber (EPR), an ethylene-propylene-non-conjugated diene copolymer rubber (EPDM) and an ethylene-octene-1 copolymer (Engage 8402 made by Dow Chemical Co., for example).

One kind of the thermoplastic elastomer or a mixture of two or more kinds of the thermoplastic elastomers can be used. The thermoplastic elastomers can also be used as a mixture with LDPE or L-LDPE, and any other resin and an additive such as a slipping agent, a pigment and an inorganic substance including calcium carbonate or titanium oxide may be contained within the range where advantageous effects are not adversely affected.

In the case where the heat-shrinkable fibers (2A) or the non-heat-shrinkable fibers (2B) are the conjugate fibers, the fibers (2A) or (2B) have heat-fusible performance caused by thermal melting or softening of the low-melting point component being a composite component thereof (the low-melting point component is involved in thermal bonding as the heat-fusible component). In particular, if the thermoplastic elastomer is used for the second fibrous layer, bonding caused by the heat-fusible performance is further reinforced by an adhesive effect, and simultaneously bonded points per se after bonding take on a rubber elastic behavior, and thus the elasticity of the nonwoven fabric is improved, and therefore preferred.

The melting point or the softening point of the heat-fusible component of the heat-shrinkable fibers (2A) or the heat-fusible non-heat-shrinkable fibers (2B) is in the range of approximately 70° C. or higher to approximately 130° C. or lower, further preferably, in the range of approximately 95° C. or higher to approximately 125° C. or lower, still further preferably, in the range of approximately 100° C. or higher to approximately 125° C. or lower.

In the case where the melting point or the softening point of the heat-fusible component of the heat-shrinkable fibers (2A) or the heat-fusible non-heat-shrinkable fibers (2B) is approximately 70° C. or lower, nep (fiber fusion) or the like is easily caused by carding friction of a metallic wire, and texture is disarrayed in the carding process for preparing the web, and therefore the case is undesirable, for example. Moreover, in the case where the melting point or the softening point exceeds approximately 130° C., the heat-shrinkable fibers (1A) used for the first fibrous layer are also melted in the low-melting point side and easily bonded, and therefore a problem of a hard feeling and a decreased elasticity is produced.

In view of spinnability and processability, a melt mass flow rate of the heat-fusible component of the heat-shrinkable fibers (2A) or the heat-fusible non-heat-shrinkable fibers (2B) is preferably in the range of approximately 0.1 to approximately 80 g/10 min., further preferably, in the range of approximately 3 to approximately 40 g/10 min. under the conditions D (190° C., 2.16 kgf) in the case where the heat-fusible component is LDPE or L-LDPE or under the conditions M (230° C., 2.16 kgf) in the case where the heat-fusible component is a thermoplastic elastomer according to JIS K7210.

Specific examples of the high-melting point component in the case where the heat-shrinkable fiber (2A) or the heat-fusible non-heat-shrinkable fibers (2B) are the conjugate fibers include polypropylene and polyester.

Specific examples of the high-melting point component in the case where the heat-shrinkable fiber (2A) or the non-heat-shrinkable fibers (2B) are the conjugate fibers include a propylene homopolymer or a copolymer of propylene with a small amount of ethylene or α-olefin, ordinarily, with approximately 2% by mass or less thereof. Specific examples of such a crystalline polypropylene include the crystalline polypropylene obtained using the versatile Ziegler-Natta catalyst or the metallocene catalyst.

In order to further increase a difference in the melting point as compared with the low-melting point component, polyester may be used as the high-melting point component. Specific examples of the polyester include polyethylene terephthalate and polybutyrene terephthalate, and a copolymer thereof.

The melting point of the high-melting point component in the case where the heat-shrinkable fibers (2A) and the non-heat-shrinkable fibers (2B) are the conjugate fibers is preferably in the range of approximately 150 to approximately 165° C., further preferably, in the range of approximately 155 to approximately 160° C. The melting point is allowed to be approximately 150° C. or higher, and thus a difference in the melting point as compared with the low-melting point component can be increased, and a width of temperature of processing during shrinking processing can be increased.

In view of spinnability and processability, a melt mass flow rate of the high-melting point component in the case where the heat-shrinkable fibers (2A) and the non-heat-shrinkable fibers (2B) are the conjugate fibers is preferably in the range of approximately 0.1 to approximately 80 g/10 min., further preferably, in the range of approximately 3 to approximately 40 g/10 min. under the conditions M (230° C., 2.16 kgf) in the case where the high-melting point component is a polypropylene or under the conditions S (280° C., 2.16 kgf) in the case where the high-melting point component is a polyester according to JIS K7210.

In the invention, the melting point or the softening point of the heat-fusible component of the heat-shrinkable fibers (2A) or the non-heat-shrinkable fibers (2B) is preferably lower than the melting point of the heat-shrinkable fibers (1A) in view of shrinking and feeling. Specifically, a melting point of the lowest-melting point component (heat-fusible component) constituting the heat-shrinkable fibers (2A) or the non-heat-shrinkable fibers (2B) is preferably lower, further preferably, lower by approximately 5 to approximately 50° C., still further preferably, lower by approximately 15 to approximately 35° C. than a melting point of the lowest-melting point component constituting the heat-shrinkable fibers (1A).

The heat-shrinkable fibers (2A) or the non-heat-shrinkable fibers (2B) may be conjugate fibers comprising resin components different from each other. In the case where the heat-shrinkable fibers (2A) or the non-heat-shrinkable fibers (2B) are the conjugate fibers, a cross-sectional shape is not particularly limited, but specific examples include a parallel type or an eccentric sheath-core type or a concentric sheath-core type in which the low-melting point component is arranged so as to constitute at least a part of a fiber surface.

A denier of the heat-shrinkable fibers (2A) or the non-heat-shrinkable fibers (2B) is preferably in the range of approximately 1.0 dtex to approximately 20 dtex, further preferably, in the range of approximately 1.5 dtex to approximately 10 dtex, still further preferably, in the range of approximately 2.2 dtex to approximately 7.0 dtex.

The heat-shrinkable fibers (2A) or the non-heat-shrinkable fibers (2B) may be short fibers, or long fibers as obtained according to the spunbond method or the melt-blown method. In the case of the short fibers, fiber length is not particularly limited, but is preferably in the range of approximately 20 to approximately 100 millimeters.

The heat-shrinkable fibers (2A) and the non-heat-shrinkable fibers (2B) may be a mixture of a plurality of kinds of the heat-shrinkable fibers (2A) and a mixture of a plurality of kinds of the non-heat-shrinkable fibers (2B), respectively.

The heat-shrinkable fibers (2A) have the shrinkage, preferably, in the range of approximately 5 to approximately 35%, further preferably, in the range of approximately 10 to approximately 25%. Then, such fibers are preferably the latent crimp conjugate fibers, further preferably, latent crimp conjugate fibers having the parallel type or the eccentric sheath-core type.

When the heat-shrinkable fibers (2A) are used as the fibers constituting the second fibrous layer, the heat-shrinkable fibers per se shrink, more specifically, crimps develop to take a corrugated or spiral form in the convex projections after heat-shrinking processing. Thus, bulkiness of developed crimps forms structure in which an inside of the convex projections is sufficiently filled with the fibers. The structure contributes to improvement in stress deformation-resistant properties of a convex projection shape, and the convex projections are not easily bent, as a result, a smooth convex projection shape is formed, and thus the nonwoven fabric acquires a feature of good contact feeling.

Moreover, when the non-heat-shrinkable fibers (2B) are used as the fibers constituting the second fibrous layer, the corrugated or spiral structure to be formed when the heat-shrinkable fibers (2A) are used is not formed in the convex projections after heat-shrinking processing. Consequently, the inside of the convex projections is not easily filled sufficiently with the fibers, and the nonwoven fabric is easily deformed due to stress or the like, a distorted shape due to bending is easily formed, and thus a rough feeling is generated on a surface of the fibrous layer. Therefore, for example, use of the nonwoven fabric for a wiper or the like features good scraping properties.

Unit Weight

In lamination between the first fibrous layer containing the heat-shrinkable fibers (1A) and the second fibrous layer containing the heat-fusible heat-shrinkable fibers (2A) or the heat-fusible non-heat-shrinkable fibers (2B) both having a smaller shrinkage as compared with the heat-shrinkable fibers (1A), a unit weight for both of the fibrous layers is preferably identical, or a ratio of the first fibrous layer is preferably higher.

An identical unit weight for both of the fibrous layers or a higher ratio of the first fibrous layer allows the first fibrous layer to acquire an improved shrinking force, and allows the second fibrous layer to be sufficiently pulled in a shrinking process, and thus generation of the convex projections can be enhanced and the elasticity can be improved.

The unit weight of the first fibrous layer is preferably in the range of approximately 10 to approximately 60 $g/m^2$, further preferably, in the range of approximately 15 to approximately 40 $g/m^2$. On the other hand, the unit weight of the second fibrous layer is preferably in the range of approximately 5 to approximately 60 $g/m^2$, further preferably, in the range of approximately 7.5 to approximately 40 $g/m^2$. A ratio of unit weight of the second fibrous layer to the first fibrous layer is preferably in the range of approximately 1:½ to approximately 1:1.

Manufacturing Method

The nonwoven fabric of the invention is obtained according to a manufacturing method including the following steps (1) to (3):

the step (1) for laminating the second fibrous layer containing the heat-fusible heat-shrinkable fibers (2A) or the heat-fusible non-heat-shrinkable fibers (2B) both having a smaller shrinkage as compared with the heat-shrinkable fibers (1A) onto at least one side of the first fibrous layer containing the heat-shrinkable fibers (1A);

the step (2) for performing bonding processing of both of the fibrous layers laminated in the step (1) and uniting both of the fibrous layers in a thickness direction with a large number of bonded parts arranged at intervals; and the step (3) for performing shrinking processing of both of the fibrous layers united in the step (2) to shrink the heat-shrinkable fibers (1A) contained in the first fibrous layer.

Hereafter, each step will be explained.

Step (1) for laminating the second fibrous layer containing the heat-fusible heat-shrinkable fibers (2A) or the heat-fusible non-heat-shrinkable fibers (2B) both having a smaller shrinkage as compared with the heat-shrinkable fibers (1A) onto at least one side of the first fibrous layer containing the heat-shrinkable fibers (1A).

In the step (1), the second fibrous layer containing the heat-fusible heat-shrinkable fibers (2A) or the heat-fusible non-heat-shrinkable fibers (2B) both having a smaller shrinkage as compared with the heat-shrinkable fibers (1A) may be laminated onto at least one side of the first fibrous layer containing the heat-shrinkable fibers (1A), and the second fibrous layer may be laminated onto both sides of the first fibrous layer.

Specific examples of methods for obtaining the laminate between the first fibrous layer and the second fibrous layer include arranging two sets of metallic wire carding machines in series to form the first fibrous layer containing the heat-shrinkable fibers (1A) being a lower layer, and to laminate the second fibrous layer containing the heat-fusible heat-shrinkable fibers (2A) or the heat-fusible non-heat-shrinkable fibers (2B) both having a small shrinkage being an upper layer thereonto from above, and thus the laminate can be continuously obtained.

Step (2) for performing bonding processing of both of the fibrous layers laminated in the step (1) and uniting both of the fibrous layers in a thickness direction with a large number of bonded parts arranged at intervals.

In the step (2), a laminated web between both of the fibrous layers laminated in the step (1) is partially bonded. Specific examples of the method for bonding the laminated web between both of the fibrous layers include a bonding method according to heat-press bonding or supersonic waves, particularly preferably, the heat-press bonding.

Specific examples of the heat-press bonding method preferably include thermocompression bonding by means of a heat embossing machine. Specific examples of the bonding method according to the supersonic waves include supersonic embossing.

The laminated web between the first fibrous layer and the second fibrous layer is subjected to heat-press bonding, and thus the heat-fusible heat-shrinkable fibers (2A) or the heat-fusible non-heat-shrinkable fibers (2B) contained in the second fibrous layer are thermally melted or softened, and a large number of bonded parts are formed, and thus both layers are partially bonded, laminated and united in a lamination contact surface between the first fibrous layer and the second fibrous layer.

A temperature of processing in the heat-press bonding is preferably under conditions where at least the heat-shrinkable fibers (2A) or the non-heat-shrinkable fibers (2B) are melted or softened and the heat-shrinkable fiber (1A) are not melted or softened, specifically, preferably in the range of approximately 70 to approximately 130° C.

The first fibrous layer and the second fibrous layer are subjected to heat-press bonding processing by heating at a temperature preferably lower by approximately 5 to approximately 15° C. than the melting point or the softening point of the heat-fusible component of the heat-shrinkable fibers (2A) or the non-heat-shrinkable fibers (2B), and thus softening of the heat-shrinkable fibers (2A) or the non-heat-shrinkable fibers (2B) starts, and therefore the surface of the first fibrous layer and the surface of the second fibrous layer can be partially bonded.

Step (3) for performing shrinking processing of both of the fibrous layers united in the step (2) to shrink the heat-shrinkable fibers (1A) contained in the first fibrous layer.

In the step (3), both of the fibrous layers united in the thickness direction in the step (2) are subjected to shrinking processing to shrink the heat-shrinkable fibers (1A) contained in the first fibrous layer and shrink the first fibrous layer, and thus to project the second fibrous layer between the bonded parts in the convex.

Specific examples of methods for shrinking processing include a hot-air circulation heat treatment machine (through-air machine) or a shrink dryer capable of giving heat under no tension. The shrink dryer is particularly preferred because shrinking is more uniformly caused at a higher degree.

A temperature of shrinking processing preferably includes a temperature at which, at least, the heat-shrinkable fibers (1A) contained in the first fibrous layer are shrunk, but the fibers constituting the first fibrous layer are not bonded with each other by thermal melting or thermal softening. Specifically, the temperature of shrinking processing is in the range of approximately 100° C. to approximately 130° C., further preferably, in the range of approximately 110° C. to approximately 128° C., still further preferably, in the range of approximately 115° C. to approximately 125° C.

Shrinking processing is performed at approximately 100° C. or higher, and thus development of shrinking of the first fibrous layer becomes sufficient. Moreover, shrinking processing is performed at approximately 130° C. or lower, and thus the first fibrous layer becomes difficult to melt on the low-melting point side, and particularly when shrinking treatment by means of the hot-air circulation heat treatment machine (through-air machine) is performed or the like, friction between a melted resin and a conveyer is prevented to allow the first fibrous layer to uniformly shrink.

When the second fibrous layer between the bonded parts projects in the convex (forms the convex projections) according to shrinking processing, the fibers in the second fibrous layer may be thermally bonded with each other in the contact points, or when the second fibrous layer contains the heat-shrinkable fibers (2A), the heat-shrinkable fibers (2A) may be thermally shrunk. When the fibers constituting the convex projections in the second fibrous layer are thermally bonded with each other in the contact points, the bonded points are preferably formed only in the contact points of the fibers with other as bonding of the fibers with each other in the contact points is different from bonding by heat-press bonding (embossing or the like) in the bonded parts between the first fibrous layer and the second fibrous layer. The reason is that, if fixing between the fibers is strongly caused and a degree of freedom is significantly deprived of, formation of a corrugated or spiral three-dimensional structure in the convex projections is suppressed.

Bonding processing and shrinking processing can be simultaneously performed. However, bonding processing and shrinking processing are allowed to be a separate step, and shrinking processing is preferably performed after bonding processing in the invention.

Bonding processing and shrinking processing are allowed to be the separate step, and shrinking processing is performed after bonding processing, and thus a nonwoven fabric having a uniform texture can be obtained. For example, when bonding processing and shrinking processing are simultaneously performed by using a heat embossing roll, a clearance (gap) between embossing rolls, in other words, a difference of elevation of projections and recesses on an embossing roll surface is restricted, and therefore a bulky nonwoven fabric may be difficult to obtain upon processing.

On the other hand, a method for performing shrinking processing using the hot-air circulation heat treatment machine or the shrink dryer after performing bonding processing using the heat embossing roll allows shrinking processing under no tension, and therefore a bulky and flexible nonwoven fabric having developed projections can be easily obtained.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereafter, the invention will be explained in more detail by way of Examples, but the invention is in no way limited by the Examples.

Shrinkage Measurement Method
(1) Heat-shrinkable Fibers (1A) and Heat-shrinkable Fibers (2A).

A web having a unit weight of 100 g/m² was prepared using individual heat-shrinkable fibers according to a carding method, length between points was measured in three places (measured at a center and both ends) in an MD direction of each web before heat treatment, and measured values were each defined as value (a). Subsequently, the individual webs were allowed to stand in an oven at 120° C. for 5 minutes, and then length between points identical to the points before heat treatment was measured, a mean thereof was defined as value (b), and shrinkage was determined according to the following equation. Shrinkage in a CD direction was also determined according a similar measurement method.

$$\text{Shrinkage (\%)} = \{(a)-(b)\}/(a) \times 100.$$

(2) Maximum Shrinkage Development Temperature of a First Fibrous Layer.

Shrinkage was determined after allowing a prepared web to stand in an oven at 100° C. for 5 minutes in accordance with the shrinkage measurement method in (1) as described above. In a similar manner, shrinkage was determined for each heat-shrinking treatment temperature, and a heat-shrinking treatment temperature reaching the largest shrinkage was defined as a maximum shrinkage development temperature of a first fibrous layer.

(3) Nonwoven Fabric of the Invention as Obtained Using the First Fibrous Layer and a Second Fibrous Later.

A nonwoven fabric was cut into a 25×25 cm piece having an area of 625 cm². Subsequently, the nonwoven fabric was subjected to heat treatment using a hot-air circulation heat treatment machine (through-air machine) for 3 seconds at a heat treatment temperature of 125° C. and a circulation hot-air velocity of 1 meter per second, and then an area was calculated to be defined as value (C), and shrinkage was determined according to the following equation.

Shrinkage (%)={(625)−(C)}/(625)×100.

Elasticity and Flexibility Evaluation Method

A sample was elongated by 50% from a sample length of 100 millimeters at a testing rate of 100 meters per minute, and then returned to the sample length, and again elongated by 50%, and loads at two points upon 50% elongation at a first time and a second time were determined by measuring strength at 10%, 20%, 30%, 40% and 50% using Shimadzu Corporation "Autograph AG500D," and a graph (S-S curve) was prepared by plotting strength in a vertical axis and strain in a horizontal axis.

As a difference between the load at the first time and the load at the second time was larger, elongation was judged to be lower. Moreover, as an inclination was higher, flexibility was judged to be lower in the graph of elongation and load.

Example 1

A first fibrous layer having a unit weight of 10 g/m$^2$ was prepared as heat-shrinkable fibers (1A) using parallel type conjugate fibers (volume ratio: 50/50) having a denier of 2.2 dtex and a fiber length of 51 millimeters and comprising polypropylene having a melting point of 160° C. and a melt mass flow rate of 15 g/10 min., and an ethylene-propylene copolymer (propylene content: 4% by mass) having a melt mass flow rate of 16 g/10 min. and a melting point of 130° C. When an identical fibrous layer having a unit weight of 100 g/m$^2$ was separately prepared and shrinkage was measured, the shrinkage was 70%.

A second fibrous layer having a unit weight of 10 g/m$^2$ was laminated thereonto, the second fibrous layer being prepared as heat-shrinkable fibers (2A) using parallel type conjugate fibers (volume ratio: 50/50) having a denier of 2.2 dtex and a fiber length of 38 millimeters and comprising polypropylene having a melting point of 160° C. and a melt mass flow rate of 15 g/10 min., and an olefin-based elastomer resin having a melting point of 100° C. and a melt mass flow rate of 20 g/10 min. When an identical fibrous layer having a unit weight of 100 g/m$^2$ was separately prepared and shrinkage was measured, the shrinkage was 25%.

Individual fibrous layers were prepared according to a carding method, and laminated for machine directions of the individual fibrous layers to be identical. A two-layer web obtained was pressed and bonded at a linear pressure of 20 kgf/cm using a heat embossing machine having an embossing area ratio of 4% at 110° C. An area of one of embossed projections of the embossing machine, the projections corresponding to bonded parts, was 0.5 mm$^2$, a distance between projections was 5 millimeters, and a shape of the projections was round. The projections were arranged in a staggered shape.

Subsequently, shrinking processing was performed by conducting heat treatment for 3 seconds at a heat-shrinking treatment temperature of 125° C. and a circulation hot-air velocity of 1 meter per second using a hot-air circulation heat treatment machine (through-air machine). An elastic nonwoven fabric was obtained in which the nonwoven fabric was shrunk at a shrinkage of 67%, and the second fibrous layer between the bonded parts was projected in a convex to a second fibrous layer side by a difference of shrinkage from a shrinkage of the first fibrous layer.

Strong helical crimps were developed between the bonded parts in the first fibrous layer. When observation was conducted by means of a digital microscope (VHX-900 made by Keyence Corporation), cross points of fibers constituting the first fibrous layer were not bonded with each other between the bonded parts. On the other hand, helical crimps weaker than the crimps of the first fibrous layer were developed in the second fibrous layer, and cross points of fibers constituting the second fibrous layer were thermally bonded with each other between the bonded parts. The projections were filled with the second fibrous layer.

Results of evaluating physical properties of the nonwoven fabric obtained are shown in Table 1. As shown in Table 1, the nonwoven fabric according to Example 1 had a high flexibility, an excellent elasticity and a good feeling.

Example 2

A first fibrous layer having a unit weight of 20 g/m$^2$ was prepared as heat-shrinkable fibers (1A) using parallel type conjugate fibers (volume ratio: 50/50) having a denier of 2.2 dtex and a fiber length of 51 millimeters and comprising polypropylene having a melting point of 160° C. and a melt mass flow rate of 15 g/10 min., and an ethylene-propylene copolymer (propylene content: 4% by mass) having a melt mass flow rate of 16 g/10 min. and a melting point of 130° C. When an identical fibrous layer having a unit weight of 100 g/m$^2$ was separately prepared and shrinkage was measured, the shrinkage was 70%.

A second fibrous layer having a unit weight of 10 g/m$^2$ was laminated thereonto, the second fibrous layer being prepared as heat-shrinkable fibers (2B) using concentric sheath-core type conjugate fibers (volume ratio: 50/50) having a denier of 2.2 dtex and a fiber length of 38 millimeters and comprising polypropylene having a melting point of 160° C. and a melt mass flow rate of 15 g/10 min., and an L-LDPE resin having a melting point of 100° C. and a melt mass flow rate of 23 g/10 min. When an identical fibrous layer having a unit weight of 100 g/m$^2$ was separately prepared and shrinkage was measured, the shrinkage was 0%.

Individual fibrous layers were prepared according to a carding method, and laminated for machine directions of the individual fibrous layers to be identical. A two-layer web obtained was pressed and bonded at a linear pressure of 20 kgf/cm using a heat embossing machine having an embossing area ratio of 4% at 110° C. An area of one of embossed projections of the embossing machine, the projections corresponding to bonded parts, was 0.5 mm$^2$, a distance between projections was 5 millimeters, and a shape of the projections was round. The projections were arranged in a staggered shape.

Subsequently, shrinking processing was performed by conducting heat treatment for 3 seconds at a heat-shrinking treatment temperature of 125° C. and a circulation hot-air velocity of 1 meter per second using a hot-air circulation heat treatment machine (through-air machine). An elastic nonwoven fabric was obtained in which the nonwoven fabric was shrunk at a shrinkage of 65%, and the second fibrous layer between the bonded parts was projected in a convex to a second fibrous layer side by a difference of shrinkage from a shrinkage of the first fibrous layer.

When observation was conducted by means of a digital microscope (VHX-900 made by Keyence Corporation), strong helical crimps were developed between the bonded parts in the first fibrous layer, and cross points of fibers constituting the first fibrous layer were not bonded with each other between the bonded parts. On the other hand, no crimps were developed in the fibers of the second fibrous layer, and cross points of fibers constituting the second fibrous layer were thermally bonded with each other between the bonded parts.

Results of evaluating physical properties of the nonwoven fabric obtained are shown in Table 1. As shown in Table 1, the nonwoven fabric according to Example 2 had a high flexibility, an excellent elasticity and a good feeling.

Comparative Example 1

A fibrous layer (1A) having a unit weight of 10 g/m² was prepared using parallel type conjugate fibers (volume ratio: 50/50) having a denier of 2.2 dtex and a fiber length of 51 millimeters and comprising polypropylene having a melting point of 160° C. and a melt mass flow rate of 15 g/10 min., and an L-LDPE resin having a melting point of 115° C. and a melt mass flow rate of 23 g/10 min. When an identical fibrous layer having a unit weight of 100 g/m² was separately prepared and shrinkage was measured, the shrinkage was 65%.

A second fibrous layer having a unit weight of 10 g/m² was laminated thereonto, the second fibrous layer being prepared using concentric sheath-core type conjugate fibers (volume ratio: 50/50) having a denier of 2.2 dtex and a fiber length of 51 millimeters and comprising HDPE having a melting point of 130° C. and a melt mass flow rate of 16 g/10 min., and polyester having a melting point of 250° C. When an identical fibrous layer having a unit weight of 100 g/m² was separately prepared and shrinkage was measured, the shrinkage was 0%.

Individual fibrous layers were prepared according to a carding method, and laminated for machine directions of the individual fibrous layers to be identical. A two-layer web obtained was pressed and bonded at a linear pressure of 20 kgf/cm using a heat embossing machine having an embossing area ratio of 15% at 125° C. An area of one of embossed projections of the embossing machine, the projections corresponding to bonded parts, was 1.5 mm², a distance between projections was 4.5 millimeters, and a shape of the projections was round. The projections were arranged in a staggered shape.

When observation was conducted by means of a digital microscope (VHX-900 made by Keyence Corporation), also as for heat-shrinkable fibers (1A) in a region other than embossed parts, cross points of fibers were found to be thermally bonded with each other by heat of an embossing roll in a thermal bonding step. Moreover, shrinking of a first fibrous layer is also simultaneously caused and the nonwoven fabric was shrunk to 58%.

Results of evaluating physical properties of the nonwoven fabric obtained are shown in Table 1. As shown in Table 1, as for the nonwoven fabric according to Comparative Example 1, fibers constituting the first fibrous layer were thermally bonded with each other, and therefore a sufficient thermal shrinking behavior was adversely affected, and simultaneously a load was applied to elongation. As a result, the nonwoven fabric obtained had a poor bulkiness and a poor flexibility, and a low elasticity.

Comparative Example 2

A web having a unit weight of 80 g/m² was prepared according to a carding method by using parallel type conjugate fibers (volume ratio: 50/50) having a denier of 2.2 dtex and a fiber length of 51 millimeters and comprising polypropylene having a melting point of 160° C. and a melt mass flow rate of 15 g/10 min., and an ethylene-propylene copolymer (propylene content: 4% by mass) having a melting point of 130° C. and a melt mass flow rate of 16 g/10 min. When an identical fibrous layer having a unit weight of 100 g/m² was separately prepared and shrinkage was measured, the shrinkage was 70%.

The web was entangled by applying a water jet at 7.84 MPa by means of a water jet processing machine, and then drying and shrinking processing were performed by means of a hot-air circulation through-air machine at 120° C. Shrinkage at the time was 22%.

Results of evaluating physical properties of the nonwoven fabric obtained are shown in Table 1. As shown in Table 1, the nonwoven fabric according to Comparative Example 2 had a good flexibility, but a poor nonwoven fabric strength because a fibrous layer was united only by entanglement of fibers constituting the fibrous layer. Moreover, a rugged shape was not formed, and the nonwoven fabric had no structure for contributing to elasticity because the web had entanglement by the water jet, and thus the web was not sufficiently shrunk in a shrinking step. As a result, the nonwoven fabric had a very poor bulkiness and a very poor elasticity.

TABLE 1

|  |  |  | Example | | Comparative Example | |
|---|---|---|---|---|---|---|
|  |  |  | 1 | 2 | 1 | 2 |
| First fibrous layer | Heat-shrinkable fibers (1A) | (Sheath/core) | PP/EPM | PP/EPM | PP/L-LDPE | PP/EPM |
|  | Melting point of high shrinkage resin | (° C.) | 160 | 160 | 115 | 160 |
|  | Shrinking start temperature | (° C.) | 100 | 100 | 90 | 100 |
|  | Maximum shrinkage development temperature | (° C.) | 150 | 150 | 115 | 150 |
|  | Shrinkage | (%) | 70 | 70 | 65 | 70 |
|  | Unit weight | (g/m²) | 10 | 20 | 10 | 80 |
| Second fibrous layer | Heat-shrinkable fibers (2A) | (Sheath/core) | PP/Olefin-based elastomer | — | — | — |
|  | Non-heat-shrinkable fibers (2B) | (Sheath/core) | — | PP/L-LDPE | HDPE/polyester | — |
|  | Melting point of low-melting point component | (° C.) | 100 | 100 | 130 | — |
|  | Shrinkage | (%) | 25 | 0 | 0 | — |
|  | Unit weight | (g/m²) | 10 | 10 | 10 | — |

TABLE 1-continued

|  |  |  | Example | | Comparative Example | |
|---|---|---|---|---|---|---|
|  |  |  | 1 | 2 | 1 | 2 |
| Manufacturing conditions | Method for bonding fibrous layers | | Embossing | Embossing | Embossing | Water jet |
|  | Embossing roll temperature | (° C.) | 110 | 110 | 125 | — |
|  | Roll linear pressure | (kgf/cm) | 20 | 20 | 20 | — |
|  | Heat-shrinking treatment temperature | (° C.) | 125 | 125 | — | 120 |
| Nonwoven fabric | Shrinkage | (%) | 67 | 65 | 58 | 22 |
|  | Elongation strength (N/5 cm) | 10% First | 0.6 | 0.5 | 3.5 | 5.6 |
|  |  | Second | 0.4 | 0.4 | 0.8 | −0.1 |
|  |  | 20% First | 1.2 | 1.4 | 11.3 | 13.1 |
|  |  | Second | 0.9 | 0.8 | 1.5 | 0.2 |
|  |  | 30% First | 2.1 | 2.8 | 23.5 | 21.5 |
|  |  | Second | 1.8 | 2.0 | 8.2 | 8.2 |
|  |  | 40% First | 3.6 | 4.2 | 35.5 | 26.9 |
|  |  | Second | 3.2 | 3.6 | 17.3 | 15.5 |
|  |  | 50% First | 6.2 | 8.5 | 52.3 | 35.5 |
|  |  | Second | 6.0 | 7.9 | 45.3 | 24.8 |
|  | Maximum strength | (N/5 cm) | 72 | 79 | 70 | 42 |

INDUSTRIAL APPLICABILITY

An elastic nonwoven fabric of the invention can be applied in a hygiene product field such as a bandage, a poultice base fabric and a female material for a hook and loop faster, a medical field and an industrial material field because the elastic nonwoven fabric can provide a high shrinkage and a high nonwoven fabric strength, and also a rugged elastic nonwoven fabric having a good feeling.

DESCRIPTION OF THE REFERENCE NUMERALS AND SIGNS

1. First fibrous layer.
2. Second fibrous layer.
3. Bonded part.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

The invention claimed is:

1. A nonwoven fabric in which a first fibrous layer and a second fibrous layer are laminated using the first fibrous layer containing heat-shrinkable fibers (1A) being latent crimp conjugate fibers and the second fibrous layer containing heat-fusible heat-shrinkable fibers (2A) having a smaller shrinkage as compared with the heat-shrinkable fibers (1A), a difference in shrinkage between the heat-shrinkable fibers (1A) and the heat-shrinkable fibers (2A) is 10% or more, and a portion of fibers constituting the first fibrous layer are bonded to a portion of fibers constituting the second fibrous layer by a plurality of bonded parts between the first fibrous layer and the second fibrous layer, which are arranged at intervals, such that the two fibrous layers are united, wherein an area of one of the bonded parts is in the range of 0.5 to 20 mm², a distance between the bonded parts is in the range of 2 to 20 millimeters, a maximum shrinkage development temperature of the first fibrous layer is 145° C. or higher, and a melting point or a softening point of a heat-fusible component of the heat-shrinkable fibers (2A) is in the range of 70° C. or higher to 125° C. or lower, a melt mass flow rate of the heat-fusible component of the heat-shrinkable fibers (2A) is in the range of approximately 0.1 g/10 min to approximately 80 g/10 min, the second fibrous layer between the bonded parts is projected in a convex by shrinking of the first fibrous layer, fibers constituting the first fibrous layer are not substantially bonded with each other by thermal melting, the first fibrous layer comprises a combination of polypropylene (PP) and ethylene-propylene rubber (EPM), the second fibrous layer comprises a combination of polypropylene (PP) and olefin-based elastomer, and the bonded parts are formed by heat-press bonding.

2. The nonwoven fabric according to claim 1, wherein the heat-shrinkable fibers (2A) are latent crimp conjugate fibers.

3. The nonwoven fabric according to claim 1, wherein the melting point or the softening point of the heat-shrinkable fibers (2A) is lower than a melting point of the heat-shrinkable fibers (1A).

4. A method for manufacturing a nonwoven fabric, comprising the following steps (1) to (3):

the step (1) for laminating a second fibrous layer containing heat-fusible heat-shrinkable fibers (2A) having a smaller shrinkage as compared with heat-shrinkable fibers (1A) onto at least one side of a first fibrous layer containing the heat-shrinkable fibers (1A), the first fibrous layer comprises a combination of polypropylene (PP) and ethylene-propylene rubber (EPM), the second fibrous layer comprises a combination of polypropylene (PP) and olefin-based elastomer, a melting point or a softening point of a heat-fusible component of the heat-shrinkable fibers (2A) is in the range of 70° C. or higher to 125° C. or lower, a melt mass flow rate of the heat-fusible component of the heat-shrinkable fibers (2A) is in the range of approximately 0.1 g/10 min to approximately 80 g/10 min;

the step (2) for performing bonding processing of both of the fibrous layers laminated in the step (1) and uniting both of the fibrous layers in a thickness direction with a large number of bonded parts arranged at intervals such that a portion of fibers constituting the first fibrous layer are bonded to a portion of fibers constituting the second fibrous layer by the bonded parts, wherein the bonded parts are formed by heat-press bonding, an area of one of the bonded parts is in the range of 0.5 to 20 mm², a distance between the bonded parts is in the range of 2 to 20 millimeters, fibers constituting the first fibrous layer are not substantially bonded with each other by thermal melting; and the step (3) for performing shrinking processing of both of the fibrous layers united in the step (2) to shrink the heat-shrinkable fibers (1A) contained in the first fibrous layer, a difference in shrinkage between the heat-shrinkable fibers (1A) and the heat-shrinkable fibers (2A) is 10% or more, a maximum shrinkage development temperature of the first fibrous layer is 145° C. or higher, and the second fibrous layer between the bonded parts is projected in a convex by shrinking of the first fibrous layer.

5. The method for manufacturing the nonwoven fabric according to claim 4, wherein bonding processing in the step (2) and shrinking processing in the step (3) are performed at a temperature equal to or lower than a melting point of the heat-shrinkable fibers (1A) contained in the first fibrous layer.

* * * * *